2 Sheets--Sheet 1.

H. J. LASH.

Washing-Machines.

No. 154,054. Patented Aug. 11, 1874.

Witnesses
J. B. Connolly
R. F. Hartman

Inventor
Henry J. Lash
By Connolly Bros.
Attorney

H. J. LASH.
Washing-Machines.

No. 154,054.

2 Sheets--Sheet 2.

Patented Aug. 11, 1874.

UNITED STATES PATENT OFFICE.

HENRY J. LASH, OF PHILADELPHIA, PENNSYLVANIA.

IMPROVEMENT IN WASHING-MACHINES.

Specification forming part of Letters Patent No. 154,054, dated August 11, 1874; application filed July 3, 1874.

*To all whom it may concern:*

Be it known that I, HENRY J. LASH, of Philadelphia, in the county of Philadelphia and State of Pennsylvania, have invented a certain new and useful Convertible Wash-Board and Washing-Machine; and I do hereby declare the following to be a full, clear, and exact description of the invention, such as will enable others skilled in the art to which it pertains to make and use it, reference being had to the accompanying drawings, which form part of this specification.

My invention has for its object to provide a device which may be used alternately as a wash-board and washing-machine.

My invention consists in the peculiar construction and combination of parts, having reference particularly to making the legs of the wash-board adjustable, so that they may be turned to serve as a handle for rocking the washing-machine.

Referring to the accompanying drawing, A shows a wash-board, having the usual fluted or corrugated surface between the sides $a\ a$. The sides $a\ a$ are extended, as shown, to form rockers, their lower edges being rounded for that purpose. Between the sides $a\ a$ are transverse partitions $b\ b$, forming chambers B B. C C represent the legs of the wash-board, connected at their extremities by the round C'. The legs C C are fastened to the sides $a\ a$ by means of set-screws D passing through slots $d$. E E represent cleats, having notches $e\ e$, in which the studs $c\ c$ fit when said legs are turned at right angles to the board to form a handle or lever for the washing-machine.

Figure 1:
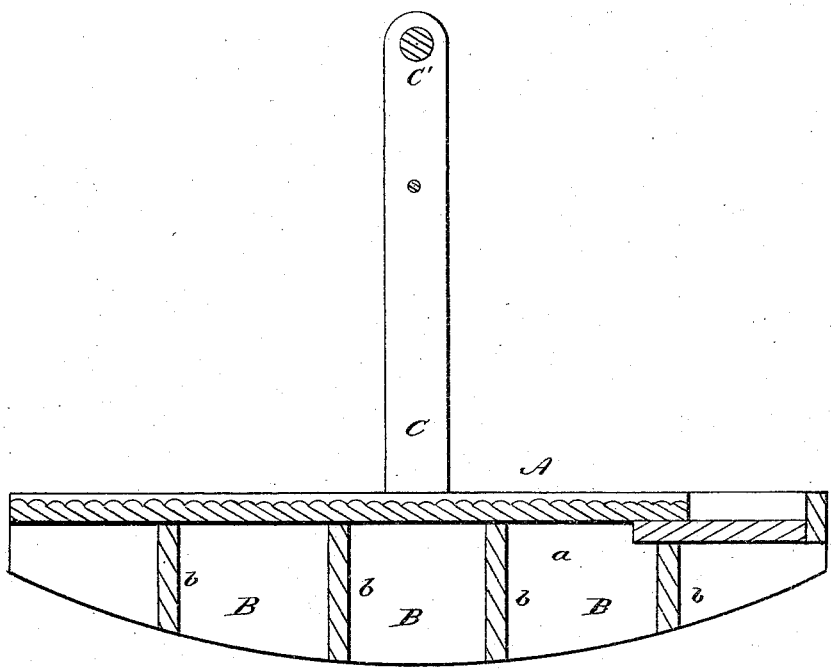
Figure 2:
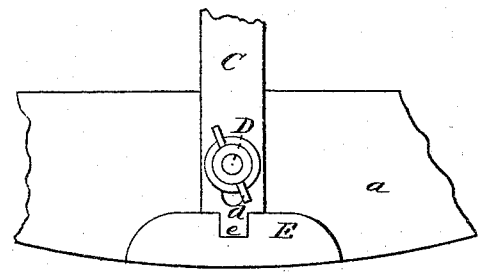
Figure 3:
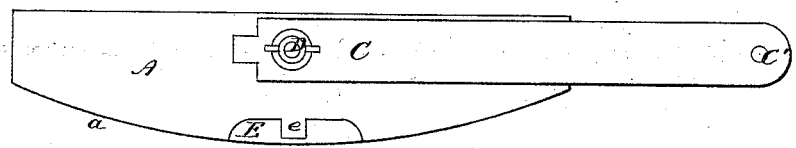

The operation of the device is simple and obvious. It is employed as a wash-board in the usual manner. When a washing-machine is required, the legs are turned as shown in Figs. 1 and 2, forming a lever or handle, by which the device may be rocked upon the clothing in a tub or other vessel.

Figure 4:
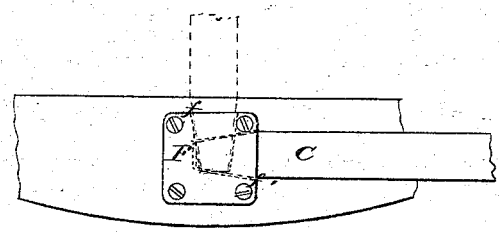

Instead of the set-screws D D, a bracket, F, (illustrated in Fig. 4,) may be employed, said bracket having two flaring sockets, $f\ f'$, in which the ends of the legs C C may be alternately inserted.

If desired, rounds or open diaphragms may be substituted for the partitions $b\ b$.

What I claim as my invention is—

The utensil herein shown and described, having a wash-board, A, on one side, chambers B B, formed by transverse diaphragms or rounds $b\ b$, on the other side, and adjustable legs C C, which serve as a handle for the washing-machine, substantially as described and illustrated.

In testimony that I claim the foregoing I have hereunto set my hand.

HENRY J. $\overset{\text{his}}{\times}$ LASH.
<br>mark.

Witnesses:
J. M. CUNNINGHAM,
HUGH COLLINS.